MEANS FOR AVOIDING SEA RETURN

Filed April 29, 1960 2 Sheets-Sheet 1

INVENTOR.
John S. Prichard
BY Lawrence I. Algase
Arthur W. Collins
ATTORNEY

INVENTOR.
John S. Prichard
BY Lawrence I. Algase
Arthur L. Collins
ATTORNEY

United States Patent Office 3,508,264
Patented Apr. 21, 1970

3,508,264
MEANS FOR AVOIDING SEA RETURN

John S. Prichard, Freeport, and Lawrence I. Algase, Bethpage, N.Y., assignors to the United States of America as represented by the Secretary of the Navy Filed Apr. 29, 1960, Ser. No. 25,809
Int. Cl. H04k *3/00;* G01s *7/34*
U.S. Cl. 343—18 4 Claims

ABSTRACT OF THE DISCLOSURE

A jamming transmitter is comprised of a superregenerator and a blocking oscillator which determines the quench period of the superregenerator. A voltage source coupled to an altimeter controls the blocking oscillator so that the sensitive period of the superregenerator does not occur during periods at which ground reflected energy of the transmitter is being received at the superregenerator.

The present invention relates to novel and improved circuitry associated with a superregenerative repeater and more particularly to novel and improved apparatus which avoids saturation of the repeater by a surface reflected signal such as sea return.

In a superregenerative radio repeater, the repeater is sensitive during a brief interval which is controlled by the quench period of the superregenerator. When the signal, which is transmitted from the repeater, is reflected back to the repeater during its sensitive interval, the reflected signal tends to saturate the repeater. When this occurs, the gain of the superregenerator is substantially diminished, and in applications where the superregenerator is used to jam the C.W. signal of an intensity sensitive enemy proximity fuse or the like, the intended function of the superregenerator is defeated.

It is therefore a principal object of the present invention to provide a novel and improved superregenerative repeater circuit that operates at top or near top efficiency without adverse effect from surface reflected energy.

It is a further object of the present invention to provide a novel and improved superregenerative repeater that discriminates against its reflected energy by preventing coincidence between the reflected pulse and the sensitive interval of the superregenerator.

Other objects and many of the attendant advantages of this invention will be readily appreciated as the same becomes better understood by reference to the following detailed description when considered in connection with the accompanying drawings wherein.

Figure 1:
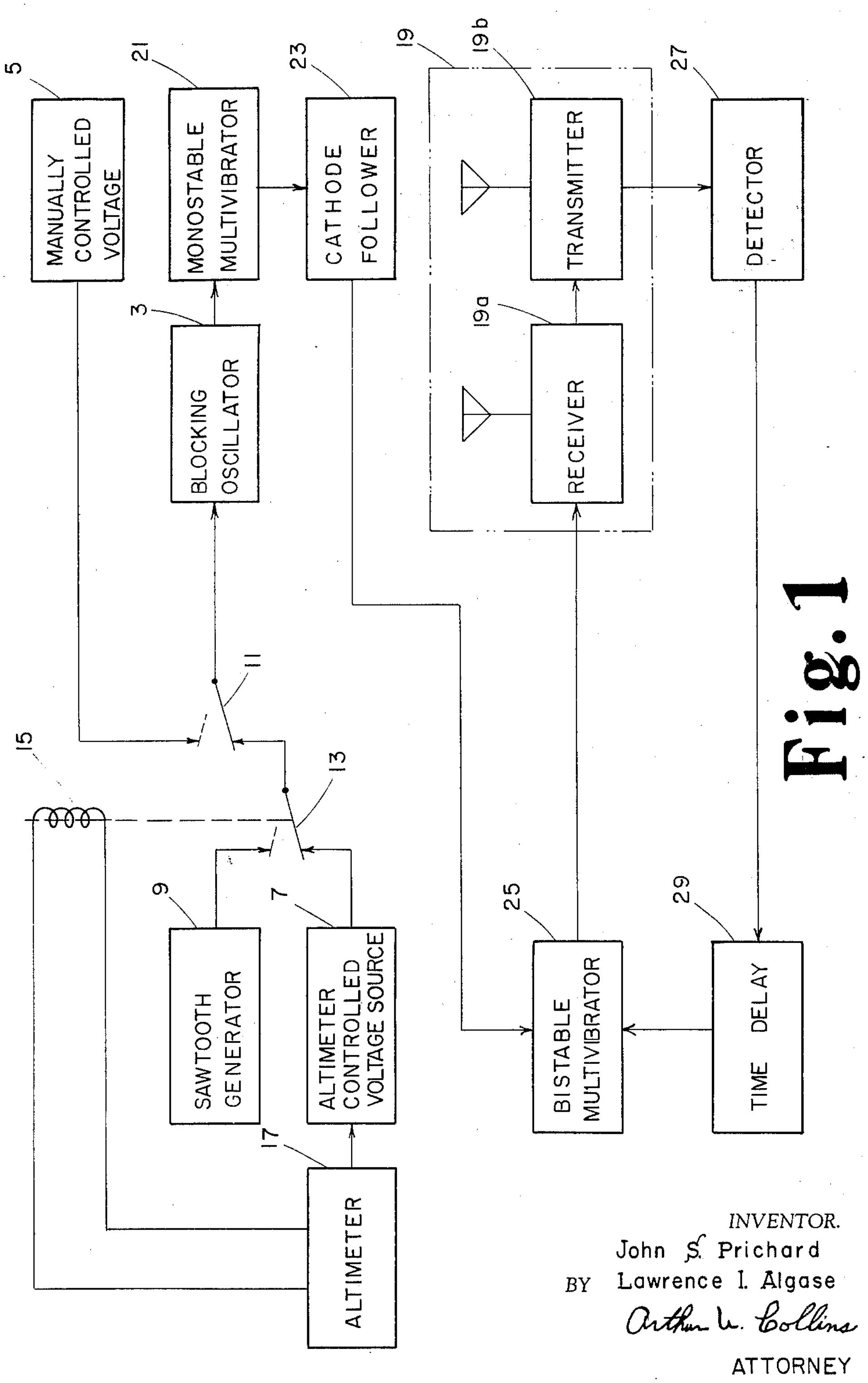
FIGURE 1 is a diagrammatic view of a preferred embodiment of the present invention.

A preferred embodiment of the present invention is shown in FIGURE 1 of the drawing. As shown therein, the input circuit of the conventional, blocking oscillator or the like 3 is coupled to the manually controlled voltage device 5, the altimeter controlled voltage source 7, or the sawtooth generator 9 depending on the condition of manual switch 11 and contact 13. The disposition of contact 13 is determined by the energizing coil of relay 15 which as will be more apparent hereinafter is normally de-energized and becomes energized when the altimeter 17 reads or exceeds a predetermined value. The output circuit of the blocking oscillator 3 is coupled to the input of the receiver section 19A of the superregenerator 19 through the monostable multivibrator 21, the cathode follower 23, and the bistable multivibrator 25. The transmitter section 19B of the superregenerator which is driven by its receiver section is coupled to the amplitude detector circuit 27 which in turn drives the bistable multivibrator 25 through the time delay device or the like 29.

Figure 2:
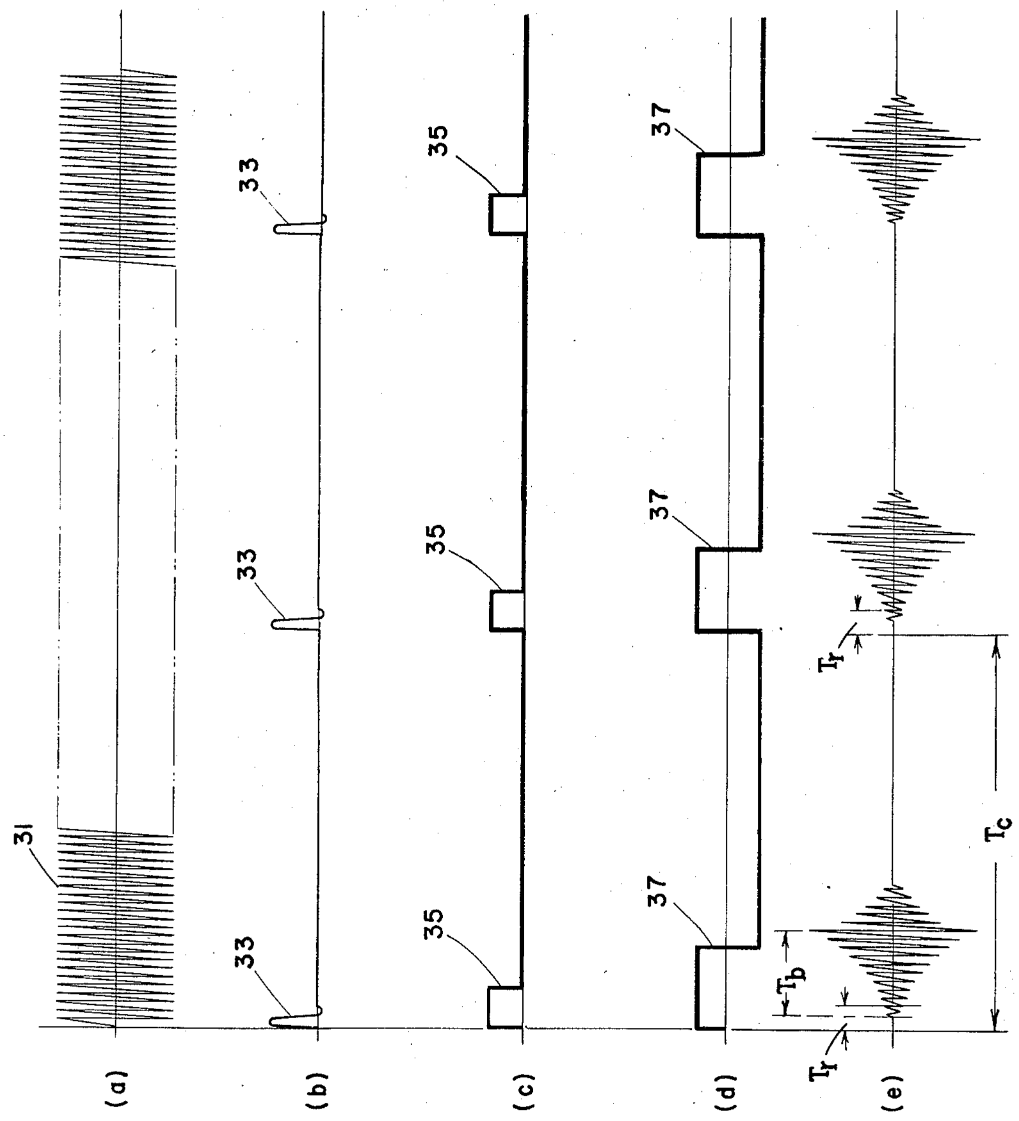
FIGURE 2 shows the waveforms of signals produced at various points in the circuit shown in FIGURE 1.

In operation the continuous wave enemy proximity fuse signal or the like 31 shown in FIGURE 2(*a*) is received on the antenna of receiver section 19A of the superregenerator. When the aircraft flies over a relatively non-reflective surface switch 11 normally occupies its upper position and the repetition frequency of the blocking oscillator 3 is controlled by the manually controlled voltage source 5. Voltage source 5 is normally set at a value minimizes the quench frequency of the superregenerator without permitting its sustained oscillations. Thus, by means of voltage source 5 the grid bias of blocking oscillator 3 is set to provide the output pulse 33 shown in FIGURE 2(*b*) of the drawing with a predetermined repetition frequency $T_c$. With each output pulse 33 of blocking oscillator 3, the monostable multivibrator 21 is energized and the pulse 35 shown in FIGURE 2(*c*) of the drawing is directed through the isolating cathode follower 23 to the bistable multivibrator 25. Pulse 35 switches the state of energization of multivibrator 25 such that the positive portion of its square wave 37 is fed to receiver 19A of the superregenerator and the normally high cutoff bias on the control grid of the Colpitts oscillator of the receiver is removed. Thus, when the enemy signal 31 is received on the receiver antenna oscillations begin to build up during the interval $T_b$ in the receiver. It has been found that these oscillations will build up and the superregenerator will oscillate at the incoming signal frequency even though the grid tank of the Colpitts oscillator is not exactly tuned to said incoming signal frequency. When the amplitude of the oscillations reach a predetermined amplitude, the detector 27 is energized and a pulse is delivered through the time delay device 29 to the multivibrator 25. When this occurs, multivibrator 25 is returned to its original state of energization and the negative portion of square wave 37 once again biases or quenches the oscillations of the superregenerator. The superregenerator then remains quenched until the next pulse 33 of the blocking oscillator again conditions the superregenerator for energization and the entire cycle is repeated.

When reflections from the sea or other highly reflective surface saturate the superregenerator and sharply reduce its operating efficiency, the manual switch 11 is operated to its lower position shown in FIGURE 1 of the drawing. When this is done and the aircraft is flying at an altitude under 8,000 feet, the relay 15 is de-energized and the grid bias on the blocking oscillator 3 is controlled by the altimeter voltage source 7. The altimeter source 7 is preadjusted in any suitable conventional manner such that its output voltage continuously varies the grid bias and therefore the quench period of the blocking oscillator in a manner that prevents coincidence of an interval of sensitivity $T_r$ of the superregenerator with the return of energy from the reflective surface. Thus, as long as the aircraft flies at an altitude of less than 8,000 feet, the grid bias voltage of blocking oscillator 3 is continuously adjusted by the altimeter such that sea return or other reflected energy can not saturate the superregenerator and impede its jamming effect.

When the altitude of the aircraft exceeds 8,000 feet, the accuracy of the altimeter becomes inadequate to properly adjust the quench period of the blocking oscillator. Thus, at 8,000 feet the relay 15 is actuated and the grid circuit of the blocking oscillator is then controlled by the output circuit of the sawtooth generator 9. The sawtooth wave of the generator 9 is shaped in any conventional manner such that the quench frequency of the blocking oscillator 3 will be continuously swept between prescribed bias voltage limits. The minimum limit is fixed by the time required for energy in the superregenerator to decay an amount sufficient to prevent self-coherence or sustained oscillations in the circuit. The maximum limit is fixed by the allowable decrease in the duty cycle and the signal output power and gain of the superregenerator.

It has been found that sweeping the quench period has negligible effect on the basic repeating action of the superregenerator. The reduction in effectiveness of the repeater due to crossing the regions of coincidence is negligible since the time spent in a coincidence region is small compared with the full period of the sweeping gate circuit for the receiver. Thus, with the above described apparatus the superregenerator also functions at altitudes in excess of 8,000 feet in its intended effective manner without danger of saturation by reflected energy.

Obviously many modifications and variations of the present invention are possible in the light of the above teachings. It is therefore to be understood that within the scope of the appended claims the invention may be practiced otherwise than as specifically described.

What is claimed is:

1. Jamming apparatus comprising a superregenerator; a blocking oscillator which determines the quench period of the superregenerator; an altimeter; a voltage source controlled by the altimeter; and means including the altimeter controlled voltage source for controlling energization of the blocking oscillator such that coincidence of the interval of sensitivity between successive quench periods with the return of energy from a reflective surface is avoided.

2. Jamming apparatus comprising a superregenerator; a blocking oscillator which determines the quench period of the superregenerator; a sawtooth generator; an altimeter; a voltage source controlled by the altimeter; switching means also controlled by the altimeter for controlling energization of the blocking oscillator from the sawtooth generator or the altimeter controlled voltage source.

3. Jamming apparatus comprising a superregenerator; a blocking oscillator which determines the quench period of the superregenerator; a sawtooth generator; an altimeter; a voltage source controlled by the altimeter; switching means also controlled by the altimeter for controlling energization of the blocking oscillator from the sawtooth generator or the altimeter controlled voltage source; a manually controlled voltage source; and means for independently energizing the blocking oscillator from said manual control source.

4. Jamming apparatus comprising an altimeter; a voltage source amplitude controlled by said altimeter; a sawtooth generator; a blocking oscillator; means including a relay controlled by said altimeter for controlling energization of the blocking oscillator from the sawtooth generator or from the altimeter controlled voltage source; a monostable multivibrator coupled to the output of the blocking oscillator; a cathode follower; a bistable multivibrator; means for coupling the output of the monostable multivibrator to one input side of the bistable multivibrator through the cathode follower; means connecting the output circuit of the bistable multivibrator to the receiver section of the superregenerator; a detector circuit coupled to the transmitter section of the superregenerator responsive to the transmitter output pulse of a predetermined magnitude; a time delay device; and means coupling the output of the detector circuit to the other input side of the bistable multivibrator through the time delay device.

References Cited

UNITED STATES PATENTS 2,476,409 7/1949 Free ---------------- 343—13

RICHARD A. FARLEY, Primary Examiner

B. L. RIBANDO, Assistant Examiner

U.S. Cl. X.R.

325—132; 343—13